United States Patent Office 3,068,450
Patented Dec. 11, 1962

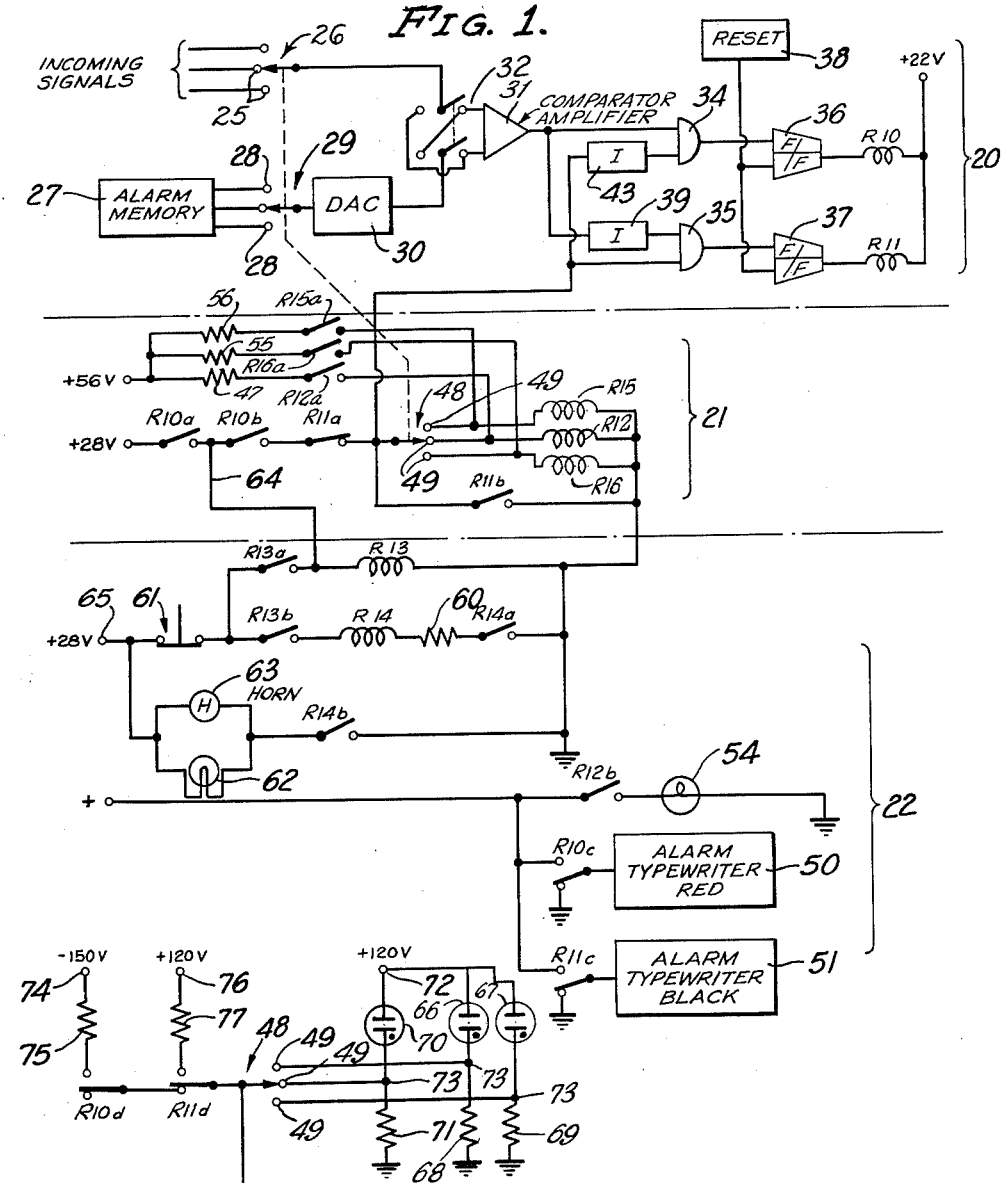
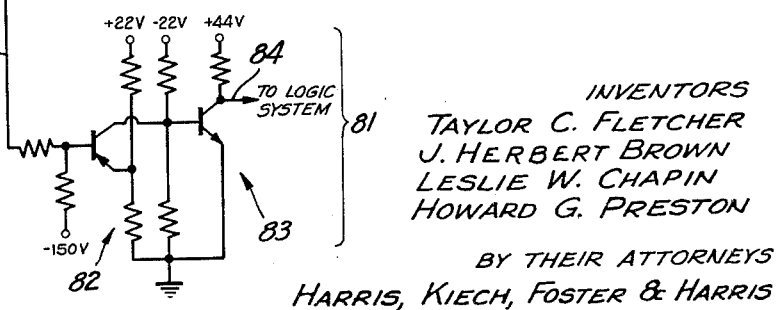

3,068,450
ALARM SWITCHING CIRCUIT
Taylor C. Fletcher, Fullerton, J. Herbert Brown, La Habra Heights, Leslie W. Chapin, Fullerton, and Howard G. Preston, Whittier, Calif., assignors to Beckman Instruments, Inc., a corporation of California
Filed Oct. 13, 1958, Ser. No. 766,992
7 Claims. (Cl. 340—149)

This invention relates to an alarm switching circuit suitable for use in data handling systems and the like.

In a data handling system a number of variables or physical conditions of parts of a plant or a combination of apparatuses are sequentially sampled, measured and operated on such that a permanent record of the physical data of the plant can be obtained for recording and/or control purposes. In a typical data handling system, hundreds of data inputs will be sampled in sequence. An important feature in a data handling system is the comparison of the measured data with preset limits for determining departure from the normal condition. Checks may be made for high off-normal conditions, low off-normal conditions, or both. The system provides an alarm in some form when off-normal input data is sampled. Furthermore, the system may provide one type of alarm when the input data is off-normal by less than some fixed value and another type of alarm, usually more demanding of attention, when the input data is off-normal by a greater amount.

An off-normal state may continue over a period of time and it is desirable to provide indications when the variable goes off-normal and when it returns to normal as well as indications of the existence of the off-normal state. Such indications require means for storing or remembering the previous state of each data sample and means for continuously indicating the state of each data sample since it was last sampled.

A data handling system of this type will require a selector switch for sequentially sampling the data inputs, a selector switch for connecting the corresponding limits into the system, and a selector switch for connecting the corresponding alarm circuitry, with the selector switches operating in synchronism. Each selector switch may comprise one or more channels as required and all the selector switches may be combined as a plurality of decks in a single stepping switch or may be a plurality of separate switches, as desired.

It is an object of the invention to provide an alarm circuit for a data handling system or the like which will provide an indication when each data input sample goes off-normal and returns to normal as well as when it is off-normal. A further object of the invention is to provide an alarm switching circuit which requires only a single selector switch channel for connecting the alarm switches into the system.

It is an object of the invention to provide an off-normal alarm system which indicates that the off-normal condition as sampled is persistent until a subsequent normal condition is sampled, such alarm system having a memory function and taking a first persistent status associated with an off-normal condition after an off-normal input has been sampled for that channel and returning to a second persistent status associated with a normal condition of the channel after a normal input has been sampled for the channel. Another object of the invention is to provide an alarm device for each data input comprising a simple binary unit or switch that takes either one of two possible conditions, dependent upon the condition of the data input and retains such condition providing memory or feedback for use in subsequent sampling of the same input. Another object of the invention is to provide such a circuit wherein the binary unit may be energized from the system and the feedback from the binary unit may be coupled to the system through a single terminal, permitting operation of the alarm system with a single channel selector.

It is an object of the invention to provide alarm circuitry which will give indications of when an input goes off-normal and goes back to normal, which indications may be visual and/or audible and which may be discontinued by actuation of an acknowledge circuit. A further object is to provide a circuitry by which the sampled data may be recorded only during going off and going on normal or throughout the off-normal condition. A further object is to provide such circuitry wherein only a single set of the units referred to in this paragraph is required for all of the input and alarm channels.

Briefly, the circuit of the invention operates with the limit comparator of a data handling system, using the output thereof in conjunction with feedback from the alarm switches for inputs to a logic circuit which produces the going off-normal and going normal signals for changing the condition of the alarm switches, with a single selector switch being used to connect the plurality of alarm switches to the logic circuit.

The invention also comprises novel details of circuitry and novel combinations and arrangements of components, together with other objects, advantages and features and results, which will more fully appear in the course of the following description. The drawing merely shows and the description merely describes preferred embodiments of the present invention which are given by way of illustration or example.

In the drawing:

FIG. 1 is a schematic diagram of the alarm switching circuit of the invention wherein relays are used as the alarm switches; and FIG. 2 is a diagram of an alternative embodiment wherein gas tubes are used as the alarm switches.

The circuitry of FIG. 1 may be divided into three sections for purposes of explanation, comprising a comparator and logic system section 20, an alarm and selector switch section 21 and an alarm unit section 22. The data inputs from the various transducers are connected to fixed contacts 25 of an input selector switch 26. While only three fixed contacts are shown for the selector switch, any number of contacts and inputs may be used. One or more limit values for each of the variable inputs are stored in an alarm memory 27, with a limit value connected to corresponding fixed contacts 28 of a selector switch 29, the switches 26 and 29 being operated in synchronism. The limit values, which ordinarily are stored in digital form, are converted to analog voltages in a digital-to-analog converter 30. A sample input signal and the corresponding limit value are connected as inputs to a comparator amplifier 31 through a double pole-double throw switch 32. The amplifier 31 produces an output indicative of whether the sampled input is normal or off-normal. For example, the output of the amplifier 31 may be zero when the sampled signal is normal or within limits and have a predetermined positive value when the sample signal is off-normal or exceeds the limit. Then it may be said that the comparator output is zero when the sample signal is normal and is a one when the sampled signal is off-normal. Of course, the converse situation may be used. The switch 32 permits an off-normal amplifier output of the same polarity for both high alarm and low alarm checks.

The equipment described in the above paragraph is conventional in data handling systems and this particular arrangement is not pertinent to the invention. Any circuit which produces a corresponding resultant signal having a normal and an off-normal indication can be substituted.

The logic circuit which controls the actuation of the alarm switches provides an output when a particular data input has changed from normal to off-normal since the previous time it was sampled and also provides an output when a data input has changed from off-normal to normal since it was previously sampled. The logic circuit includes "and" gates or coincidence circuits 34, 35 and flip-flops 36, 37. The coil of a relay R10 is energized by the flip-flop 36 when in the zero state and the coil of a relay R11 is energized by the flip-flop 37 when it is in the zero state. While relays are utilized in the embodiment of FIG. 1, it is understood that other types of switches are equally suitable and may be substituted in the practice of the invention.

The flip-flops 36, 37 are initially set to their zero states by a pulse from a reset unit 38. The output of the comparator amplifier 31 is connected directly to the "and" gate 34 and is connected to the "and" gate 35 through an inverter 39. The inverter may be a conventional circuit which produces a zero when the input thereto is a one and produces a one when the input thereto is zero. Hence, when the output of the comparator amplifier 31 is a one for off-normal and a zero for normal, as discussed above, an off-normal input sample will produce a one at "and" gate 34 and a zero at "and" gate 35. The other input to each of the "and" gates comes from a feedback line 42 which carries a signal representative of the sampled input channel during the previous sampling of the channel. The feedback line 42 provides a one if the channel was previously off-normal or in alarm, and a zero if the channel was previously normal or within limits. The feedback line is connected to the "and" gate 34 through an inverter 43 and is directly connected to the "and" gate 35.

"And" gate 34 provides an output when both inputs are ones, i.e., when the sampled data input is off-normal and was normal during the preceding sampling. Hence, the "and" gate 34 may be referred to as the going off-normal gate since it produces an output to change the flip-flop 36 to the one state when a data input has changed from normal to off-normal. Then relay R10 is designated the going off-normal switch. "And" gate 35 produces an output when the sampled input is normal and was off-normal at the preceding sampling, i.e., when both inputs thereto are ones. Coincidence at the "and" gate 35 produces an output which changes the flip-flop 37 to the one state with the "and" gate 35 and the relay R11 known as the going normal gate and switch, respectively. When a flip-flop is changed to the one state, the corresponding relay is unenergized.

In the diagram of FIG. 1, the coils of relays are identified by the letter R and an appropriate number, such as R10, and the sets of contacts actuated by a relay coil are identified by the same number and a following letter, such as R10a, R10b, etc. The alarm and selector switch section 21 includes contact sets R10a and R10b of relay R10; sets R11a and R11b of relay R11; relay coils R12, R15 and R16, and respective contact set R12a, R15a and R16a; resistors 47, 55 and 56 respectively; connected in series with the sets R12a, R15a and R16a; and a selector switch 48. The selector switch 48 may be similar to the selector switches 26 and 29, having a plurality of fixed contacts 49 corresponding to the data input contacts 25. The relays R12, R15 and R16 may be referred to as alarm switches and there will be a separate relay connected to each contact 49 with the selector switch 48 operated in synchronism with the selector switch 26 so that each of the alarm switches corresponds to a particular input channel.

The circuit of FIG. 1 is shown in the normal condition with the flip-flops 36 and 37 in the zero state, the relays R10 and R11 energized, a zero output from the comparator amplifier 31 and a zero feedback signal on the line 42. Then the alarm switch or relay R12 associated with the particular input data being sampled is unenergized. Let us assume that on stepping to the next input channel, the comparator amplifier 31 determines that the incoming signal exceeds the limit set in the alarm memory 27 for that channel. The output of the comparator amplifier will be a one or an off-normal signal. Then both inputs to the "and" gate 34 will be ones and the flip-flop 36 will be changed to the one state, de-energizing the coil R10 and closing contact sets 10a and 10b. When these contact sets close, the particular alarm switch R12 connected in circuit therewith by the selector switch 48 and the closed contact R11a will be energized. When the coil R12 is energized, the contact set R12a is closed, also energizing the coil through the resistor 47 and set R12a independently of the sets R10a, R10b, R11a and the selector switch 48. Thus, when the selector switch moves on to sample another channel, the alarm switch for the previously sampled channel will remain in the energized or alarm state, thereby providing a continuous indication that this particular input is off-normal. Another contact set R12b may be actuated by the relay R12 to provide the indication of the condition of the channel. The set R12b may connect a lamp 54 to a voltage source resulting in a continuous visual indication of the channel condition, there being a separate lamp for each alarm switch and channel.

When the selector switch again samples this particular channel, the feedback signal on the feedback line 42 will be a one supplied by the 56 volt source through the resistor 47, the set R12a and the selector switch 48. Thus, the input to the "and" gate 34 through the inverter 43 will be a zero and the relay R10 will remain energized even though the input signal is still off-normal, the flip-flop 36 having been reset to the zero state in the interim. Thus, it is seen that relay R10, the going off-normal switch, is actuated or changed from the energized to the unenergized condition only when a particular sampled input has changed from the normal to the off-normal condition. Contact set R10c may be used to provide an indication of when a channel has gone off-normal, such as by energizing an alarm typewriter 50 to print in red, the set R10c connecting the typewriter 50 to a positive voltage source.

During a subsequent sampling of the input channel under consideration, the incoming signal will again be within the preset limit and the output of the comparator amplifier will be a zero or a normal signal. This zero is converted to a one by the inverter 39, resulting in two ones at the "and" gate 35, since the feedback signal for this particular channel is a one. Then the flip-flop 37 is changed to the one state and the relay R11 is unenergized. Contact set R11b is closed shunting the relay coil R12, causing the contact set R12a to open. Thus, the alarm switch for this channel is returned to the normal condition. It should be noted that the relay R11 is actuated only when the sampled input changes from off-normal to normal, this relay being referred to as the going normal switch. The going normal switch may be used to provide an indication of when a channel changes from off-normal to normal, such as by means of the contact set R11c which connects an alarm typewriter 51 to a voltage source for printing in black.

Thus it is seen that indications of whether a sampled channel is normal or not, when the sampled channel goes off normal and when the sampled channel returns to normal, are obtained for a plurality of input channels. This information is provided for the plurality of inputs while requiring duplication of only the alarm switch R12 and its associated resistor 47, which resistor is used to isolate the relay coil sufficiently so that the coil may be shunted without shorting the power supply. Only the terminal 52 of the alarm switch has to be switched by the selector switch with both the feedback signal and the means for actuating the alarm switch being transferred at this point.

The alarm unit section 22 includes relays R13 and R14, a dropping resistor 60, a normally closed push button 61, a light 62 and a horn or other audible unit 63. When contact set R10a is closed, indicating that a data input has gone off normal, the coil of relay R13 is energized through a line 64 resulting in closing of contact sets R13a and R13b. Contact set R13a maintains the coil of relay R13 energized from a source 65 and the set R13b energizes the coil of relay R14 from the same source. The normally closed contact set R14a of relay R14 and the serially connected resistor 60 operate as an oscillator or buzzer circuit, causing the contact set R14b to continually close and open, intermittently energizing the light 62 and horn 63. These alarm units serve to call the attention of the operator of the system to the fact that a channel has gone off normal and they may be disconnected by actuating the push button 61 to interrupt the circuit to the relay R13. The contact sets R10b and R11a isolate the line 64 from the alarm switches and the feedback line so that the alarm unit section 22 will be energized only when a channel goes off normal.

It will be noted that while a particular significance has been given to the energized and unenergized conditions of each of the relays, this is not significant to the invention and the relay relationship may be changed, and also the significance of the ones and zeros of the logic circuit may be changed while still following the teaching of the invention and achieving the desired result. However, it is a feature of the invention that each of the alarm switches associated with each of the input channels maintains an indication of the condition of the input channel at the time it is sampled throughout the following period until the channel is again sampled and each of these alarm switches may be connected into the remainder of the circuitry by a single contact of the selector switch.

An alternative embodiment for the invention is shown in FIG. 2 wherein another binary device, gas tubes 66, 67 and 70, are substituted for the relays R12, R15 and R16 as the alarm switches. Each of the gas tubes is connected in series with respective resistors 68, 69 and 71 between a positive voltage source 72 and circuit ground with the junction 73 of the tube and resistor being connected to a fixed contact 49 of the selector switch 48. The magnitudes of the continuously applied voltage and the series resistor are selected so that they are sufficient to maintain the tubes in the conducting state but not sufficient to initiate conduction. The circuit of FIG. 2 is used in conjunction with the comparator and logic system 20 of FIG. 1. When the gas tube is not conducting, the potential of the point 73 will be near ground. When the going off-normal switch R10 is actuated by shifting of the flip-flop 36 to the one state, contact set R10d connects a negative voltage source 74 to the point 73 through a resistor 75, the contact set R11d and the selector switch 48. This negative voltage serves to initiate induction in the tube, resulting in a change in potential of the point 73 toward the positive direction, the tube remaining in conduction after the negative source 74 is disconnected and the selector switch moves on to other input channels. When the going normal switch R11 is actuated by a change of the flip-flop 37 to the one state, a positive voltage source 76 is connected to the point 73 by contact set R11d through a resistor 77 and the selector switch 48. This positive voltage, which is equal to that of the source 72, stops conduction of the gas tube.

All the gas tubes belonging to individual channels may be arranged in rows and columns on a panel, and the channel number associated with each tube, indicated on this panel. Thereby, the attendant can immediately see which channel or channels are in alarm condition.

A feedback line 80 is connected to the moving contact of the selector switch 48 to provide the desired feedback signal to the logic circuit. The circuitry of section 81 comprising a first transistor amplifying stage 82 and a second transistor amplifying stage 83 is for the purpose of changing the high voltage level signals from the gas tube to a lower voltage level for use with the logic circuit of section 20, with the output appearing at the line 84. The output on the line 84 is either a zero or a one with the effect of the negative 150 supply being eliminated in the transistor circuitry.

Other bistable devices which persist in a given condition once forced to that condition by an appropriate signal and which can then be brought back to their original condition by another appropriate signal can be used as the alarm switches. A conventional flip-flop would be an example of such a suitable binary device.

While exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. In a system for sequentially sampling a plurality of data inputs and comparing same with corresponding limits to determine if the sampled data is normal or off-normal and indicating when the data goes from normal to off-normal and from off-normal to normal, the combination of: a plurality of alarm switches with an alarm switch corresponding to each data input, and with each alarm switch having a normal condition and an off-normal condition; a going off-normal switch; a going normal switch; a comparator for generating normal and off-normal signals representative of the relative values of the inputs thereto; a selector switch for simultaneously connecting a particular data input and a corresponding limit value to said comparator as inputs thereto and connecting the corresponding alarm switch in circuit with said going normal and going off-normal switches; means for actuating said going off-normal switch when the selected data input is off-normal and the corresponding selected alarm switch is in the normal condition, said going off-normal switch on actuation changing the selected alarm switch to the off-normal condition; and means for actuating said going normal switch when the selected data input is normal and the corresponding selected alarm switch is in the off-normal condition, said going normal switch on actuation changing the selected alarm switch to the normal condition.

2. In a system for sequentially sampling a plurality of incoming signals, the combination of: a plurality of alarm indicating switches, each of said alarm indicating switches having a normal condition and an alarm condition, each of said alarm indicating switches producing a feedback signal representative of its condition; means for comparing an incoming signal with a standard signal and producing a resultant signal which is either normal or off-normal, representative of the relative conditions of the incoming and standard signals; a first coincidence circuit; a second coincidence circuit; means for coupling said resultant signal to said coincidence circuits as an input thereto; a selector switch for sequentially connecting the feedback signal of each of said alarm indicating switches to said coincidence circuits as another input thereto, with said first coincidence circuit actuating the connected alarm indicating switch to the alarm condition when its inputs are an off-normal resultant signal and a normal feedback signal, with said second coincidence circuit actuating the connected alarm indicating switch to the normal condition when its inputs are a normal resultant signal and an alarm feedback signal, with each alarm indicating switch being so connected for a selected period and not connected for a nonselected period; and means for maintaining each alarm indicating switch in the condition of its last selected period during the subsequent non-selected period.

3. In a system for sequentially sampling a plurality of data inputs and comparing same with corresponding limits to determine if the sampled data is normal or off-normal and indicating when the data goes from normal to off-normal and from off-normal to normal, the combination of: a plurality of alarm switches with an alarm switch corresponding to each data input, each alarm switch having a normal condition and an off-normal condition, and each of said alarm switches having an actuation terminal for changing the condition thereof and generating a condition signal at said actuation terminal representative of the condition of the switch; a going off-normal switch for changing a connected alarm switch to the off-normal condition; a going normal switch for changing a connected alarm switch to the normal condition; a comparator for generating a resultant signal which is either normal or off-normal representative of the relative values of the inputs thereto; a selector switch for connecting a particular data input and a corresponding limit value to said comparator as inputs thereto and connecting the actuation terminal of the corresponding alarm switch in circuit with said going off-normal and going normal switches; and coincidence circuit means for actuating said going off-normal switch when said resultant signal is off-normal and the connected condition signal is normal, and actuating said going normal switch when said resultant signal is normal and the connected condition signal is off-normal.

4. In a system for sequentially sampling a plurality of data inputs and comparing same with corresponding limits to determine if the sampled data is normal or off-normal and indicating when the data goes from normal to off-normal and from off-normal to normal, the combination of: a plurality of alarm switches with an alarm switch corresponding to each data input, each alarm switch having a normal condition and an off-normal condition, and each having an actuation terminal for changing the condition thereof, each alarm switch having an actuation source connected to said actuation terminal by a holdup switch which is controlled by the alarm switch to maintain the alarm switch in the off-normal condition when switched thereto by other means temporarily coupled to said actuation terminal; an alarm switch control circuit having an output terminal; and a selector switch for sequentially connecting said output terminal of said control circuit to the actuation terminal of each of said alarm switches, said control circuit including means for energizing the connected alarm switch to change it to the off-normal condition when the corresponding sampled data is off-normal and the connected alarm switch is in the normal condition, and de-energizing the connected alarm switch to change it to the normal condition and shunting the actuation source when the corresponding sample data is normal and the connected alarm switch is in the off-normal condition.

5. In a system for sequentially sampling a plurality of data inputs and comparing same with corresponding limits to determine if the sampled data is normal or off-normal and indicating when the data goes from normal to off-normal and from off-normal to normal, the combination of: a plurality of alarm relays with a relay corresponding to each data input, each relay having a normal condition and an off-normal condition and each having an actuation terminal for changing the condition thereof, each relay having a power source connected to said actuation terminal by a set of contacts on the relay to maintain the relay in the off-normal condition when switched thereto by other means temporarily coupled to said actuation terminal; an alarm switch control circuit having an output terminal; and a selector switch operated in synchronism with the data sampler for sequentially connecting said output terminal of said control circuit to the actuation terminal of each of the corresponding relays, said control circuit including means for energizing the connected alarm relay to switch to the on condition when the corresponding sampled data is off-normal and the connected relay is in the normal condition, and de-energizing the connected alarm relay to switch to the normal condition and shunting the connected power source when the corresponding sampled data is normal and the connected relay is in the off-normal condition.

6. In a system for sequentially sampling a plurality of data inputs and comparing same with corresponding limits to determine if the sampled data is normal or off-normal and indicating when the data goes from normal to off-normal and from off-normal to normal, the combination of: a plurality of alarm switches with an alarm switch corresponding to each data input, each switch comprising a gas tube having a conducting and a nonconducting condition providing normal and off-normal indications, each alarm tube having a permanently connected power source capable of maintaining but not initiating conduction in the tube and each having an actuation terminal for changing the condition thereof; an alarm tube control circuit having an output terminal; and a selector switch operated in synchronism with the data sampler for sequentially connecting said output terminal of said control circuit to the actuation terminal of each of the corresponding tubes, said control circuit including a conduction initiate voltage supply and a conduction extinguish voltage supply and switching means for connecting one of said supplies to said output terminal to change the condition of the connected tube to indicate off-normal when the corresponding sampled data is off-normal and the connected tube is in the normal condition, and for connecting the other of said supplies to said output terminal to change the condition of the connected tube to indicate normal when the corresponding sampled data is normal and the connected tube is in the off-normal condition.

7. In an alarm switching circuit, the combination of: a plurality of alarm means for indicating off-normal excursions of input data, each of said alarm means having a normal and an off-normal condition, and each of said alarm means having a single actuation and condition feed-back terminal; circuit means for determining whether a sampled input is in a normal or off-normal state and generating a corresponding normal or off-normal signal; control means for changing the condition of an alarm means connected thereto; a logic circuit coupled to said control means in driving relationship and having the signal of said circuit means as an input; and a selector switch for sequentially connecting the single terminal of each of said alarm means to said logic circuit as another input and to said control of the connected alarm means, said logic circuit driving said control means to change the connected alarm means to the off-normal condition when said circuit means generates an off-normal signal and the connected alarm means feeds back a normal condition signal, and driving said control means to change the connected alarm means to the normal condition when said circuit means generates a normal signal and the connected alarm means feeds back an off-normal condition signal.

References Cited in the file of this patent

UNITED STATES PATENTS

| | | |
|---|---|---|
| 2,712,898 | Knutsen | July 12, 1955 |
| 2,923,476 | Ketchledge | Feb. 2, 1960 |